2 Sheets—Sheet 1.

J. H. THOMAS.

Horse Rake.

No. 9,373. Reissued Sept. 7, 1880.

Witnesses.
Franck L. Durand
Alex Mahon

Inventor
John H. Thomas
by A. M. Smith
Atty.

N. PETERS, PHOTO-LITHOGRAPHER, WASHINGTON, D. C.

2 Sheets—Sheet 2.

J. H. THOMAS.

Horse Rake.

No. 9,373. Reissued Sept. 7, 1880.

Witnesses.
Franck L. Durand
Alex Mahon

Inventor.
John H. Thomas
by A. M. Smith
Atty.

N. PETERS, PHOTO-LITHOGRAPHER, WASHINGTON, D. C.

UNITED STATES PATENT OFFICE.

JOHN H. THOMAS, OF SPRINGFIELD, OHIO.

HORSE-RAKE.

SPECIFICATION forming part of Reissued Letters Patent No. 9,373, dated September 7, 1880.

Original No. 172,206, dated January 11, 1876. Application for reissue filed July 30, 1880.

*To all whom it may concern:*

Be it known that I, JOHN H. THOMAS, of Springfield, county of Clarke, State of Ohio, have invented certain new and useful Improvements in Horse-Rakes, of which the following is a full, clear, and exact description, reference being had to the accompanying drawings, making part of this specification, in which—

Figure 1:
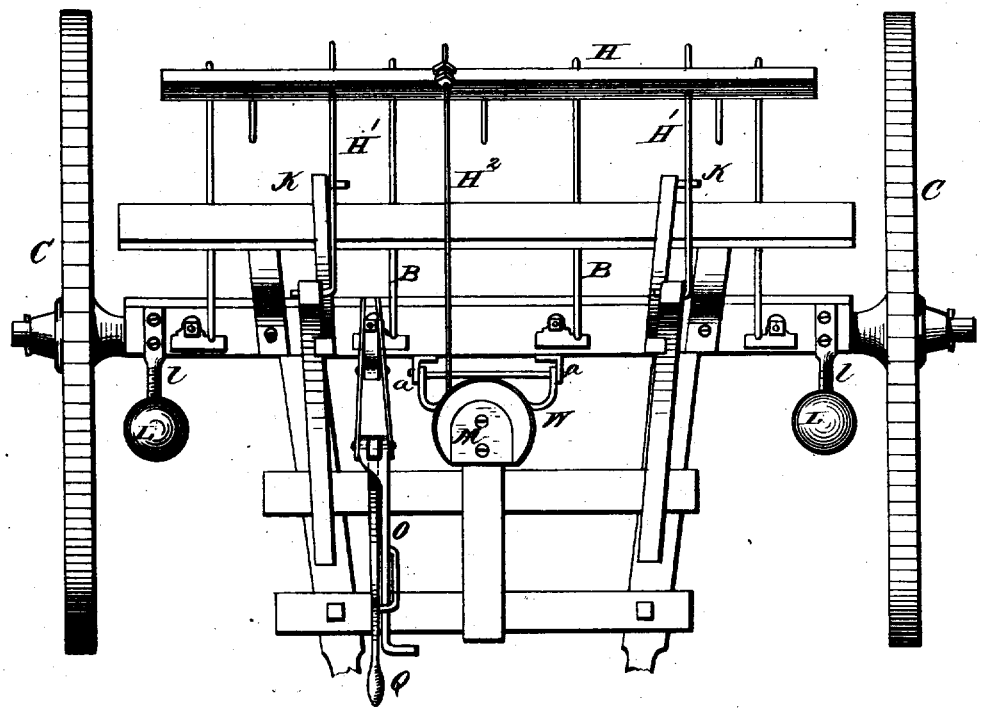
Figure 2:
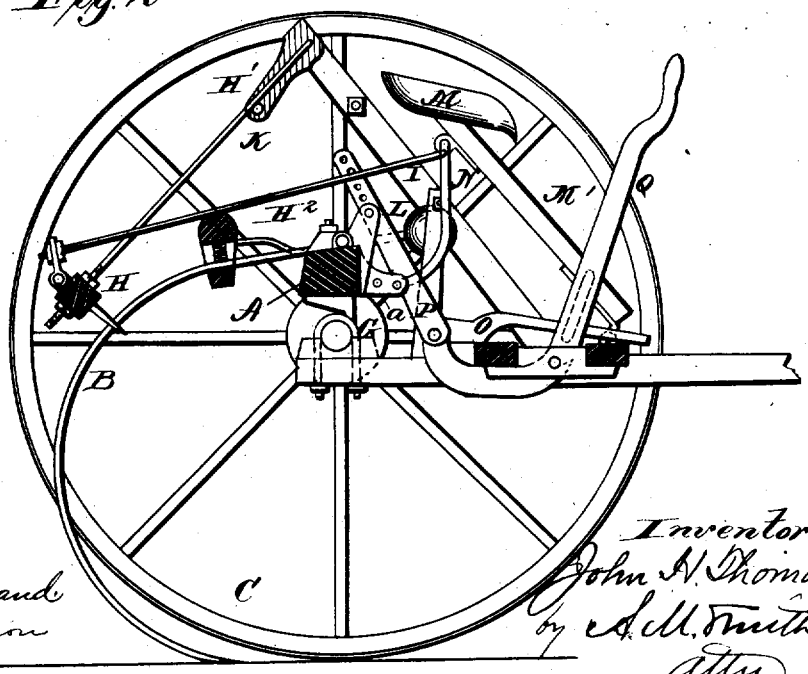
Figure 3:
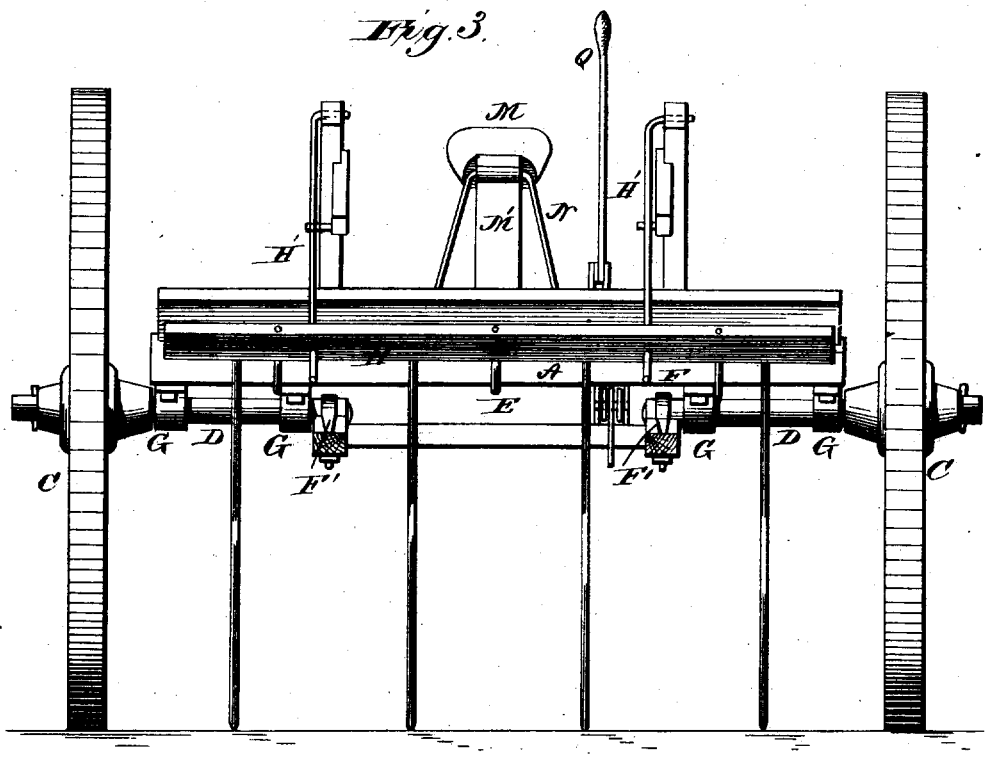
Figure 4:
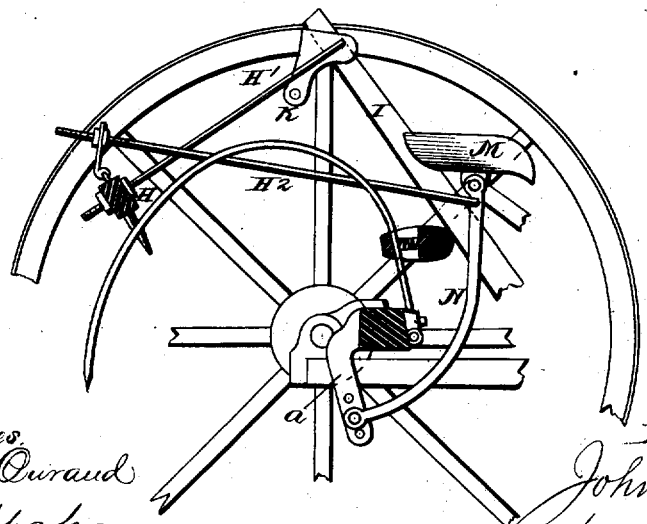

Figure 1 is a plan view of my improved horse hay-rake. Fig. 2 represents a vertical longitudinal section through the same. Fig. 3 represents a rear elevation; and Fig. 4 is a sectional view similar to Fig. 2, with the rake-teeth elevated to discharge the load.

Similar letters of reference denote corresponding parts wherever used.

The nature of my improvements will be understood from the following description with reference to the drawings, in which—

A represents the rake-head, made, by preference, quadrilateral in form in cross-section, with its upper side beveled or inclining backward slightly to conform to the inclination of the ends of the rake-teeth secured thereto, as shown in Fig. 2, whereby I effect a saving in the weight of the teeth, and, while preserving the vertical or substantially vertical relation of the sides of the rake-head or axle, simplify the construction of the rake-teeth, as in the ordinary construction the rake-teeth are horizontal on the rake-head and their downward inclination begins behind the latter, whereas in the present construction the downward inclination begins at the point of attachment to the rake-head, and the teeth can consequently be made shorter than they otherwise could.

The rake-head is carried upon two wheels, C C, which rotate upon short spindles or journals secured to the shaft-frame E by clamps F, the arms of which pass through metal caps or socket-pieces F′, in which the spindles fit snugly, also through the ends of the shafts. The spindles being thus confined to the shafts or shaft-frame do not turn with the rake-head, but the latter rocks thereon. The rake-head is secured to the spindles by means of sleeves or collars G, which permit the rake-head to rock on said spindles, as described. The rake-teeth B are held down by a bearing or presser-bar in a well-known manner.

H is the clearer, consisting of a transverse bar provided with straight pendent teeth, which project down between the rake-teeth, its object being to strip the hay from the latter when they are raised to discharge their load. It is attached to rods H′, pivoted to inclined supporting-standards I, rigidly secured to the shaft-frame, as shown.

Arms or brackets K are rigidly attached to the supports I, extending backward and downward therefrom, and are provided at their lower ends with pins or stops, which project laterally under the rods H′ and serve to limit their downward throw in such manner as to hold the clearer raised above the rake-teeth when the latter are down upon the ground, as shown in Fig. 2, thereby preventing its interference with the rake-teeth when the latter are in position for gathering their load.

It will be seen that by this arrangement the clearer is disconnected from the dumping-rake and from the hand lever for actuating said rake, and is raised by devices separate therefrom above and clear of the rake head and teeth when the latter are down, and said parts are conseqently relieved of the weight and friction of the clearer at that point and at the beginning of the upward or dumping movement of the rake, thereby facilitating the dumping of the latter, while at the same time preventing any interference of the clearer with the rake while gathering its load. As the rake-teeth are raised the clearer-teeth pass between them, and as the rake-teeth rock upward and forward the clearer-teeth serve effectually to strip them of their load.

Iron balls L may be used for counterbalancing the weight of the rake-teeth, said balls being connected with the rake-head by means of arms *l*, secured to said head and projecting forward therefrom, as shown.

The connection between the arms *l* and balls L may be by screw-thread, permitting the adjustment of the balls toward or away from the rake-head, as may be desired, for regulating or adapting the counter-balance to the weight of the driver, which is also made to act upon the rake-head with a tendency to lift the rake-teeth, as follows: The seat M is attached to an inclined standard, M′, hinged or pivoted at its lower forward end to the shaft-frame, and upheld at its rear upper end by a bent or U-shaped rod or support, N, pivoted at its loop end in a bracket on the standard M′, and having the ends of its arms pivoted in the forward ends of arms or brackets *a a*, rigidly connected with and projecting forward from the rake-head, as shown. These arms *a a* are arranged, by preference, as shown in Fig. 4—that is to say, connected with the lower face of the rake-head or projecting forward therefrom in such relation thereto as to bring the forward ends, at the point of attachment to the support N, in advance of and near about into the same horizontal plane with the spindles D or pivotal point upon which the rake-head turns. By this arrangement it will be seen that the weight of the driver has its greatest leverage for rocking the rake-teeth upward when the latter are in or near the position for gathering their load, and that, as the arms *a a* rock downward and backward underneath the rake-head, until the rake-teeth are lifted into position to discharge their load, the leverage will be gradually reduced to a minimum, and will exert but slight power to uphold the rake-teeth, thereby facilitating the labor of returning the teeth to the proper position for gathering a new load, in which position they are held by pressure of the driver's foot upon a foot-lever, O.

A hand-lever, Q, is used to assist in rocking the rake head and teeth; but said hand and foot levers being substantially the same as those described in Letters Patent granted to me November 16, 1875, No. 170,130, it is unnecessary to describe them here.

By the arrangement of parts as described it will be seen that the weight of the driver is made to materially assist in the operation of dumping the rake, as when the rake is in or near the position for gathering its load said weight exerts its greatest leverage, and that when the rake-teeth are elevated and the load discharged said weight exerts the least leverage, while, owing to the fact that the leverage increases as the rake-teeth descend, the latter are prevented from falling with a sudden jar upon and digging into the ground, and are thereby saved from injury, therein differing from the arrangement shown in my former patent above referred to, where the leverage diminishes as the rake-teeth descend.

The arms *a a* have a number of eyes or perforations in their length, facilitating the adjustment of the support N to suit the weight of the driver.

Having now described my invention, I claim—

1. The driver's-seat support connected to arms on the rocking rake-head in front of and at a point or points about in the same horizontal plane with the pivot on which the rake-head turns, substantially as and for the purpose set forth.

2. The combination of the pivoted seat-support with the rocking rake-head, substantially as described, whereby the weight of the driver is made to exert its greatest leverage for dumping the rake when the latter is in position for gathering its load.

3. The driver's-seat support connected with the rocking rake-head, substantially as described, whereby it is made to exert its greatest leverage for dumping the rake, while serving to prevent the too sudden fall of the teeth after the load has been discharged, substantially as described.

4. The short stationary spindles on which the carrying-wheels rotate, in combination with the rake-head rocking thereon, substantially as described.

5. In combination, with the rake A B and driver's seat resting upon the front side of the rake-head, the adjustable counterpoise L, attached to the rake-head on the same side as the supports to the driver's seat, substantially as set forth.

6. In combination with the wheels and short stationary spindles attached to the shaft-frame, the rake-head A and collars G, attaching the rake-head to the spindles, so that it shall revolve around them as a center, substantially as set forth.

7. In a rake where the clearer is employed crossing the rake above and outside of the teeth, means disconnected from the dumping-rake and from the hand-lever for operating said rake for holding the clearer clear of the rake-teeth and of the rake-head when the teeth are down, thus relieving the rake when in that position of the weight of the clearer, substantially as described.

JOHN H. THOMAS.

Witnesses:
A. P. LINN COCHRAN,
F. B. FURNISS.